Dec. 30, 1958  W. FINCHER  2,866,554
ADJUSTABLE HANGER FOR THE SHAKER SCREEN OR SIEVE
OF A PURIFIER OR LIKE MACHINE
Filed March 18, 1957  2 Sheets-Sheet 1

INVENTOR.
Walter Fincher
BY
Paul E Mullendore
ATTORNEY

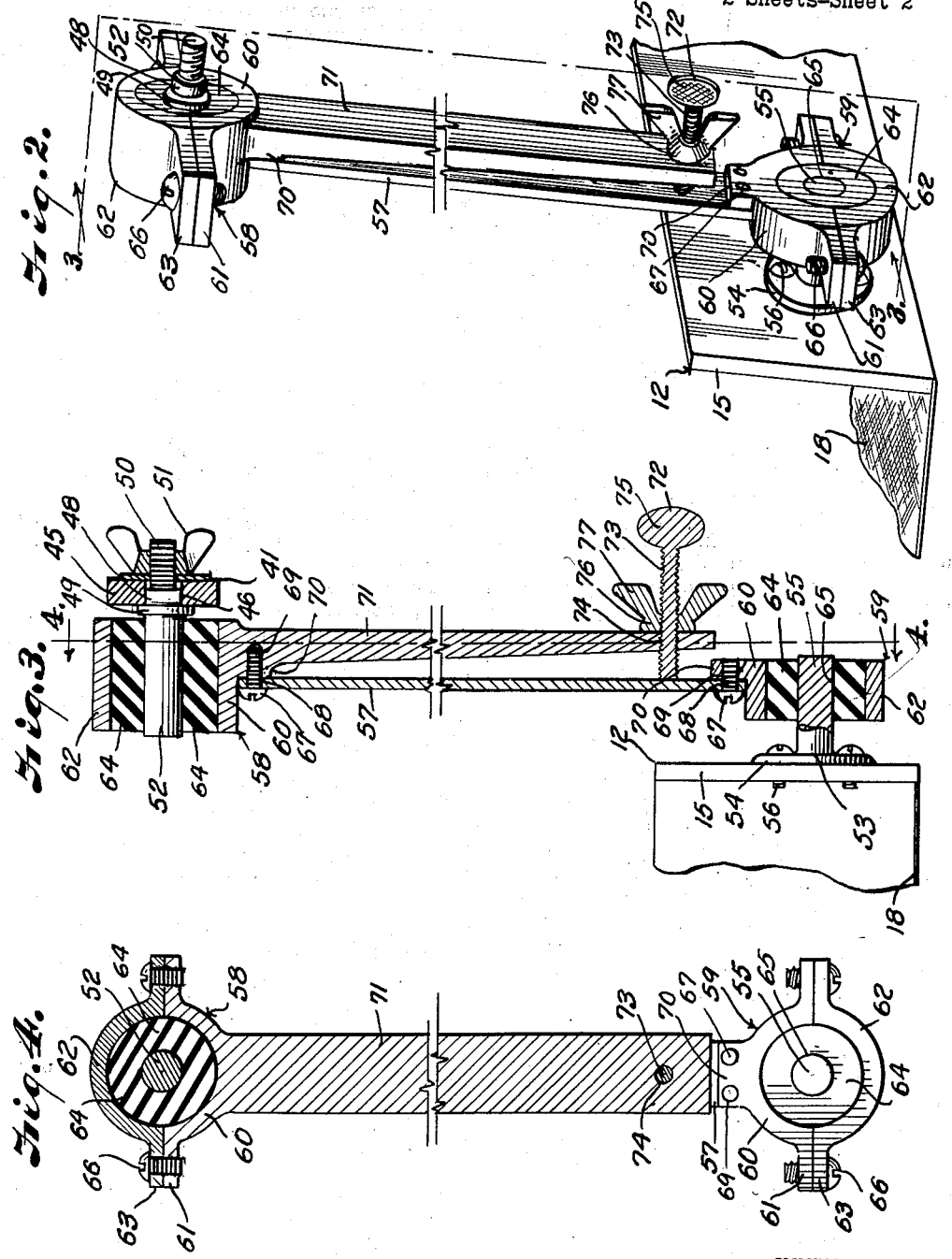

United States Patent Office 2,866,554
Patented Dec. 30, 1958

2,866,554

ADJUSTABLE HANGER FOR THE SHAKER SCREEN OR SIEVE OF A PURIFIER OR LIKE MACHINE

Walter Fincher, Hughesville, Mo.

Application March 18, 1957, Serial No. 646,711

6 Claims. (Cl. 209—415)

This invention relates to purifiers and like machines employing shaker screens or sieves, and more particularly to the hangers on which the screens or sieves are suspended.

Purifiers used in purification of flour stock include a casing in which a sieve is suspended on hangers, so that the sieve may be oscillated to cause progressive movement of the flour stock along the length of the sieve while air is passed therethrough. The sieve is actuated by spaced apart eccentrics rotatably supported by the casing and connected with the sieve by eccentric rods. The efficiency of such purifiers is dependent upon distribution of the flour stock in a uniform steady stream across the entire width and along the full length of the sieve. Provision is made for adjusting the driving connections with the sieve so as to obtain optimum conditions. The adjustments are made by trial and error, and it is difficult to obtain the proper spread of the flour stock over the width and length of the sieve.

It is, therefore, a principal object of the invention to provide a more convenient and efficient adjustment for such sieves while in operation and movement of the flour stock is being observed through windows in the side of the purifier casing.

Other objects, a principal object of the invention to provide a more convenient and efficient adjustment for such sieves while in operation and movement of the flour stock is being observed through windows in the side of the purified casing.

Other objects of the invention are to provide hangers in which the adjustment features are incorporated; to provide a resilient hanger which is adapted to be flexed intermediate its length to shift the sieve carried thereby until the material is being advanced and uniformly discharged off the full width of the sieve; and to provide hangers of this character which have resiliently bushed connections at the respective ends thereof for eliminating play and wear that might interfere with maintenance of the desired adjustment.

It is a further object of the invention to provide a hanger having the adjustment feature and which is of simple and inexpensive construction.

In accomplishing these and other objects of the invention as hereinafter pointed out, I have provided improved structure, the preferred form of which is illustrated in the accompanying drawings, wherein:

Fig. 2 is an enlarged perspective view of a portion of the sieve and one of the hangers removed from its supporting bracket.

Fig. 3 is a longitudinal section through the hanger on the line 3—3 of Fig. 2, with the addition that the pivot pin is shown as anchored in the T-shaped head of its supporting bracket.

Fig. 4 is a longitudinal section taken at right angles to the section of Fig. 3, the place of the section being indicated by the line 4—4 in Fig. 3.

Figure 1:
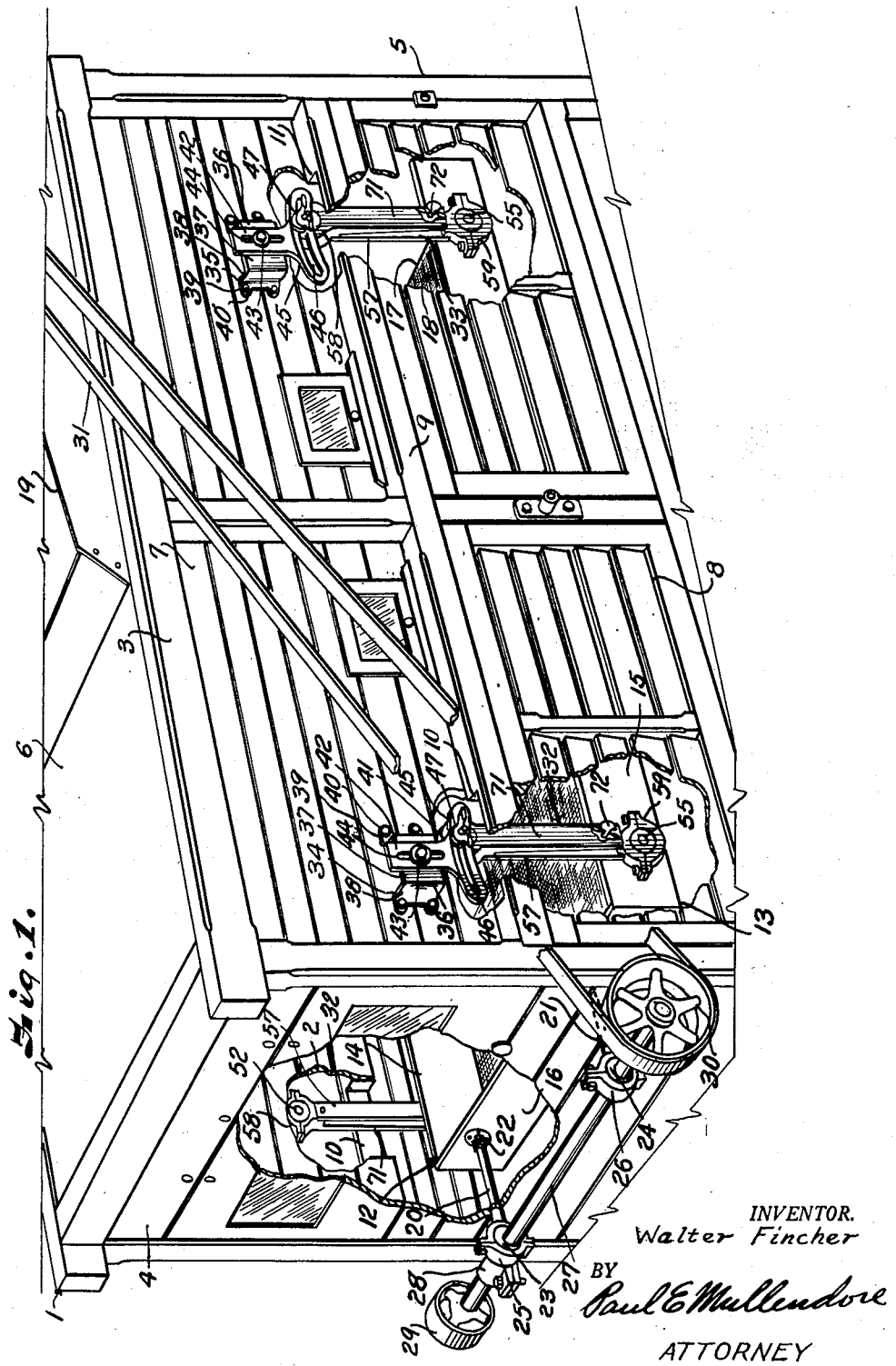
Fig. 1 is a perspective view of a purifier equipped with sieve hangers embodying the features of the present invention, portions of the casing of the purifier being broken away to better illustrate the sieve and the hangers therefor.

Referirng more in detail to the drawings:

1 designates a purifier such as used in purifying flour stock. The purifier includes a substantially rectangular casing having side walls 2—3, end walls 4—5, and a top 6. In the illustrated instance, the side walls have upper and power portions 7 and 8, with the lower portions offset outwardly at longitudinal frame members 9 of the casing, and which are provided with notches 10 and 11 near the respective ends thereof for passing hangers. The hangers are usually pivoted to the upper portions of the side walls and lower ends depend through the notches into the interior of the casing and are pivotally connected with the sieve 12. The sieve 12 has a frame 13 having sides 14—15, an end 16, and an open opposite end 17. The frame 13 carries a screen 18, which in the case of a flour purifier comprises a cloth having the desired mesh to support the flour stock and to pass air in sufficient volume for removing the impurities. The air flow is effected by the suction of a fan, which in the purifier illustrated, is mounted on the top of the casing at the rear end thereof, as indicated by the housing 19.

The sieve is oscillated on the hangers by rods 20 and 21 that pivotally connect with the end 16 of the sieve at spaced apart points, as indicated at 22. The rods 20 and 21 are connected with eccentrics 23 and 24 by means of eccentric straps 25 and 26, the eccentrics being attached to a transverse shaft 27 journaled in bearing brackets 28 on the end wall 4 of the casing. The shaft is rotated by a pulley 29 that is adapted to be operated from a suitable source of power. The shaft also carries a pulley 30 that operates the fan 19 by means of a belt 31.

The flour stock is delivered onto the screen 18 of the sieve near the end 16 by means of a distributor (not shown) and is discharged across the entire width of the sieve. If the sieve and shaft 27 are properly aligned, with the sieve level transversely thereof, and the connecting rods properly adjusted, the flour stock will be caused to move in a thin uniform flow over the entire length and width of the sieve and be discharged uniformly from the open end 17. In order to obtain this optimum condition, the sieve must be level in a transverse direction and oscillated in an exact fore-and-aft direction. If not, then the flour stock will move off to one or the other sides of the sieve. This is primarily because of variation in the length of the connecting rods. As above stated, various methods have been devised for adjusting the length of the rods, but this adjustment must be by trial and error. The present invention, however, provides an improved hanger with adjustment features to compensate for irregular oscillatory action and the adjustments may be made while the sieve is in motion, so as to visually observe the movement of the flour stock during adjustment. Thus, the adjustments may be readily effected to assure that the flour stock advances uniformly along the length of the sieve and is discharged uniformly across the open end thereof.

In carrying out the invention, the sieve 12 is suspended between pairs of hangers 32 and 33, with the hangers of one pair connected with respective sides 14 and 15 of the sieve near the end 16 and the other pair with the discharge end 17, as now to be described.

Mounted exteriorly of the side walls 2 and 3 of the casing in registry with the notches 10 and 11 are brackets 34 and 35, each including a fixed part 36 having a transverse plate portion 37 and laterally directed leg portions 38 terminating in foot flanges 39, whereby the brackets are attached to the side walls of the housing by fastening devices such as bolts 40. The parts 36 of the brackets are thus rigidly mounted in fixed position on the exterior of the casing side walls to provide for attachment of the adjustable parts 41 of the hangers. Each of the parts 41 has a plate portion 42 which is retained in an adjusted position on the plate portion 37 of the fixed parts 36 by fastening devices such as bolts 43 that extend through slots 44 in the plate portions 42 and through holes in the plate portions 37 whereby the adjustable parts are adapted to be rigidly clamped to the fixed parts of the hangers. The adjustable part of each hanger also includes a depending T-shaped head 45 provided with an arcuate slot 46. Adjustable in each arcuate slot is a trunnion member 47. Each trunnion member 47 includes a head portion 48 adapted to engage in the slot 46 and having flanges 49 engaging the inner side face of the adjustable part of the bracket. Each trunnion member also has a threaded stem 50 which projects from the arcuate slot 46 to mount a wing nut 51. The wing nut 51 cooperates with the flange 49 of the head in clamping the trunnion member in any position along the length of the arcuate slot 46. The trunnion member also has a trunnion or pin 52 that extends laterally of the bracket to support the upper end of a hanger, as later to be described.

The sieve 12 has trunnion members 53 provided with plate portions 54 that are secured to the sides of the sieve by fastening devices 56 that extend through the plate portions and into the side walls of the sieve, as best shown in Fig. 3. Extending from the plate portions are pins 55.

When the trunnion members are in position, the pins 52 of the upper members 47 extend inwardly toward the wall of the casing and in the spaces as provided by the leg portions 38 of the fixed parts 36 of the brackets, and the pins 55 of the lower members extend outwardly toward the inner face of the side walls of the casing, so that they are substantially one above the other to be connected by the hangers.

Each hanger includes a flexible strap portion 57 formed of spring material and of sufficient thickness and width to be rigid under normal working conditions, but which are adapted to be flexed for positioning the sieve laterally, as later described. Fixed to the respective ends of the strap portion 57 of each hanger are gripping collars 58 and 59. Each gripping collar includes a semicylindrical portion 60 having laterally extending ears 61 to connect a semicylindrical cap portion 62, also having ears 63 to seat on the ears 61 for clamping a resilient bushing 64, which is of substantially larger diameter than the pins 52 and 55. The bushings have axial openings 65 to pass the hanger onto the pins 52 and 55 and to grip the pins 52 and 55 when fastening devices 66 are tightened in the ears 61 and 63 to constrict the bushings about the pins so that when the hangers are oscillated under action of the sieve 12, the relative movement between the pins 52—55 and the hangers is solely because of the resiliency of the bushings. Thus wear and looseness of the pins is eliminated. The collars are connected with the strap portions of the hangers by fastening devices such as screws 67, having shanks that are passed through openings 68 in the ends of the strap portion of the hanger and into threaded openings 69 that are provided in integral lugs 70 formed as parts of the gripping collars.

With the construction thus far described, the sieve is suspendedly supported by means of the hangers, and when oscillated the relative movement between the hangers and trunnions is entirely in the resiliency of the bushings, and the sieve 12 may be oscillated in a fore-and-aft direction to effect movement of the flour stock, as above described. However, the flow of the flour stock will probably shift to one or the other sides of the sieve 12, and to avoid this difficulty, each hanger includes means for positioning the sieve within the casing. Such means includes a substantially rigid shank or arm 71 on one or the other of the trunnion collars, preferably the trunnion collar that is carried by the fixed bracket, in which case the rigid shank extends downwardly in parallel relation with the flexible strap portion 57 of the hanger. Carried by each arm 71 is a thumb screw 72 having a threaded stem 73 turned within a threaded opening 74 of the arm and adapted to bear against the outer face side of the strap portion 57 of the hanger whereby when the head 75 of the thumb screw is rotated in one direction the end of the stem, bearing upon the strap portion of the hanger, will cause shifting of the sieve away from the side wall of the casing, and when the thumb screw 72 is turned in the opposite direction the spring action in the strap portion of the hanger will allow the sieve to move toward the wall of the casing, and by which proper alignment of the sieve may be obtained, as later described. The adjustment of the thumb screws 72 is maintained by jam nuts 76 mounted on the stems of the thumb screws and adapted to bear against the outer faces of the arms 71. For convenience, the jam nuts 76 may be provided with wings 77.

Assuming that the sieve 12 is suspended between the pairs of hangers as described, and that with the sieve 12 in operation with flour stock being discharged on the screen 18 near the end wall 15, the particles of flour stock lift and fall with oscillation, so that each particle is progressively moved toward the discharge end of the sieve while air is blown upwardly through the screen 18 to carry away the extremely light particles, while the heavier particles remain on the screen until they pass through the screen or are discharged from the open end thereof. More than likely, the stream will shift laterally across the sieve toward one side thereof, for example, the flour stock may tend to move toward the left side of the sieve, responsive to oscillation thereof by the eccentrics. This difficulty is corrected by loosening the jam nuts 76 and turning the thumb screws in the proper direction until the sieve is properly positioned within the casing to give the desired discharge off the end of the sieve. The sieve may also be adjusted to level in a transverse direction by loosening the bolts 40 that secure the adjustable part of the hangers to the fixed part of the hangers and by sliding the adjustable parts up or down, as required, after which the adjustable part is again fixed to the stationary part by retightening the bolts 40. The sieve may also be moved fore or aft within the casing by loosening the wing nuts 51 on the trunnion members 47 and moving the trunnion members 47 forwardly or rearwardly within the arcuate slots 46 of the adjustable parts of the brackets. By properly locating the trunnion members 47 in the arcuate slots, the rear end of the sieve may be raised and the forward end lowered, to give the desired downward pitch to the sieve, as may be required for a given material.

From the foregoing, it is obvious that I have provided a hanger whereby a sieve may be adjusted up and down and forwardly or rearwardly to adjust the height and to level the sieve transversely. It is also obvious that the sieve may be shifted laterally to compensate for any tendency of the flour stock to move toward one or the other sides of the sieve responsive to the oscillatory action as effected by the connecting rods 20 and 21 and the eccentrics 23 and 24.

It is also obvious that the adjustments may be made while observing the movement of the flour stock on the sieve, so that the adjustments may be effected to produce the desired movement of the flour stock over the surface of the sieve, and particularly to maintain the flour stock uniformly distributed over the entire surface of the screen 18 and to effect uniform discharge from off the end of the sieve.

What I claim and desire to secure by Letters Patent is:

1. In a purifier, a casing, a sieve, hangers for supporting the sieve for oscillation in the casing, said hangers having resilient pivotal connections with the casing, and eccentrics connected with the sieve to effect oscillations of the sieve, at least one of said hangers including a resilient strap portion and a rigid arm portion and adjusting means carried by said arm portion and engaging the resilient strap portion to flex said strap portion for adjusting the sieve laterally of the oscillations effected by the eccentrics.

2. In a purifier, a casing, a sieve, hangers on opposite sides of the sieve for supporting the sieve for oscillation in the casing, and eccentrics connected with the sieve to effect oscillation of the sieve, said hangers on one side of the sieve each comprising a resilient strap portion and a rigid arm portion and adjusting means carried by said arm and engaging the resilient strap portion to flex the strap portion for shifting the sieve laterally in said casing.

3. A hanger for connecting a lateral pin on a sieve of a purifier with a fixed pin on the casing of the purifier, said hanger including a resilient body part, clamping collars on ends of the resilient body part, resilient bushings in said collars and having openings passing the pins, a rigid part on one of said clamping collars, and means for exerting pressure between the rigid part and the resilient body part to move one of the clamping collars away from a plane of the other.

4. A hanger for connecting a lateral pin on a sieve of a purifier with a fixed pin on the casing of the purifier, said hanger including a resilient body part, clamping collars on ends of the resilient body part, resilient bushings in said collars and having openings passing the pins, a rigid part on one of said clamping collars, and a screw having a stem in threaded connection with the rigid part and bearing upon the resilient body part.

5. In a purifier, a casing, brackets on opposite sides of the casing each having a fixed part and an adjustable part provided with a lateral pin, a sieve, pins on opposite sides of the sieve, hangers having resilient means engaging the pins for supporting the sieve for oscillation in the casing, and eccentrics connected with the sieve to effect oscillation of the sieve, said hangers on one side of the sieve each comprising a resilient strap portion and a rigid arm portion and adjusting means carried by said arm and engaging the resilient strap portion to flex the strap portions for shifting the sieve laterally in said casing.

6. A hanger for connecting a lateral pin on a sieve of a purifier with a fixed pin on the casing of the purifier, said hanger including a resilient strap portion, clamping collars on ends of the resilient strap portion, resilient bushings in said collars and having openings for passing the pins, a rigid arm on one of said clamping collars and extending along the strap portion in spaced relation therewith, and a screw threaded through the said arm and having an end bearing upon the resilient strap portion to move one of the clamping collars away from a plane of the other.

References Cited in the file of this patent

UNITED STATES PATENTS

| | | |
|---|---|---|
| 454,130 | Gray | June 16, 1891 |
| 454,131 | Gray | June 16, 1891 |
| 1,468,005 | Coyle et al. | Sept. 18, 1923 |
| 2,225,444 | Gary | Dec. 17, 1940 |